United States Patent [19]
Giardini et al.

[11] 3,932,069
[45] Jan. 13, 1976

[54] VARIABLE RELUCTANCE MOTOR PUMP

[75] Inventors: Dante S. Giardini, Dearborn Heights; Lewis E. Unnewehr, Birmingham, both of Mich.

[73] Assignee: Ford Motor Company, Dearborn, Mich.

[22] Filed: Dec. 19, 1974

[21] Appl. No.: 534,512

[52] U.S. Cl................................ 417/420; 310/268
[51] Int. Cl.²....................................... F04D 13/02
[58] Field of Search..................... 417/420; 310/268

[56] References Cited
UNITED STATES PATENTS

| | | | |
|---|---|---|---|
| 2,700,343 | 1/1955 | Pezzillo | 310/268 UX |
| 2,782,721 | 2/1957 | White | 310/268 X |
| 3,194,165 | 7/1965 | Sorlin | 417/420 UX |
| 3,575,536 | 4/1971 | Jacobs | 417/420 |
| 3,700,943 | 10/1970 | Heintz | 310/112 |

*Primary Examiner*—Alan Cohan
*Attorney, Agent, or Firm*—Robert W. Brown; Keith L. Zerschling

[57] ABSTRACT

A motor pump wherein the motor is a variable reluctance motor having a rotor which functions as an impellor to provide pumping action as a result of centrifugal force acting upon a fluid supplied to the motor pump. The motor pump is extremely simple in that it has only one moving part, its rotor, which is formed of a plurality of ferromagnetic elements spaced from one another with flow passages located between the elements. Fluid enters the pump on the radially inner side of the ferromagnetic elements and flows radially through the flow passages to the pump discharge outlet.

1 Claim, 3 Drawing Figures

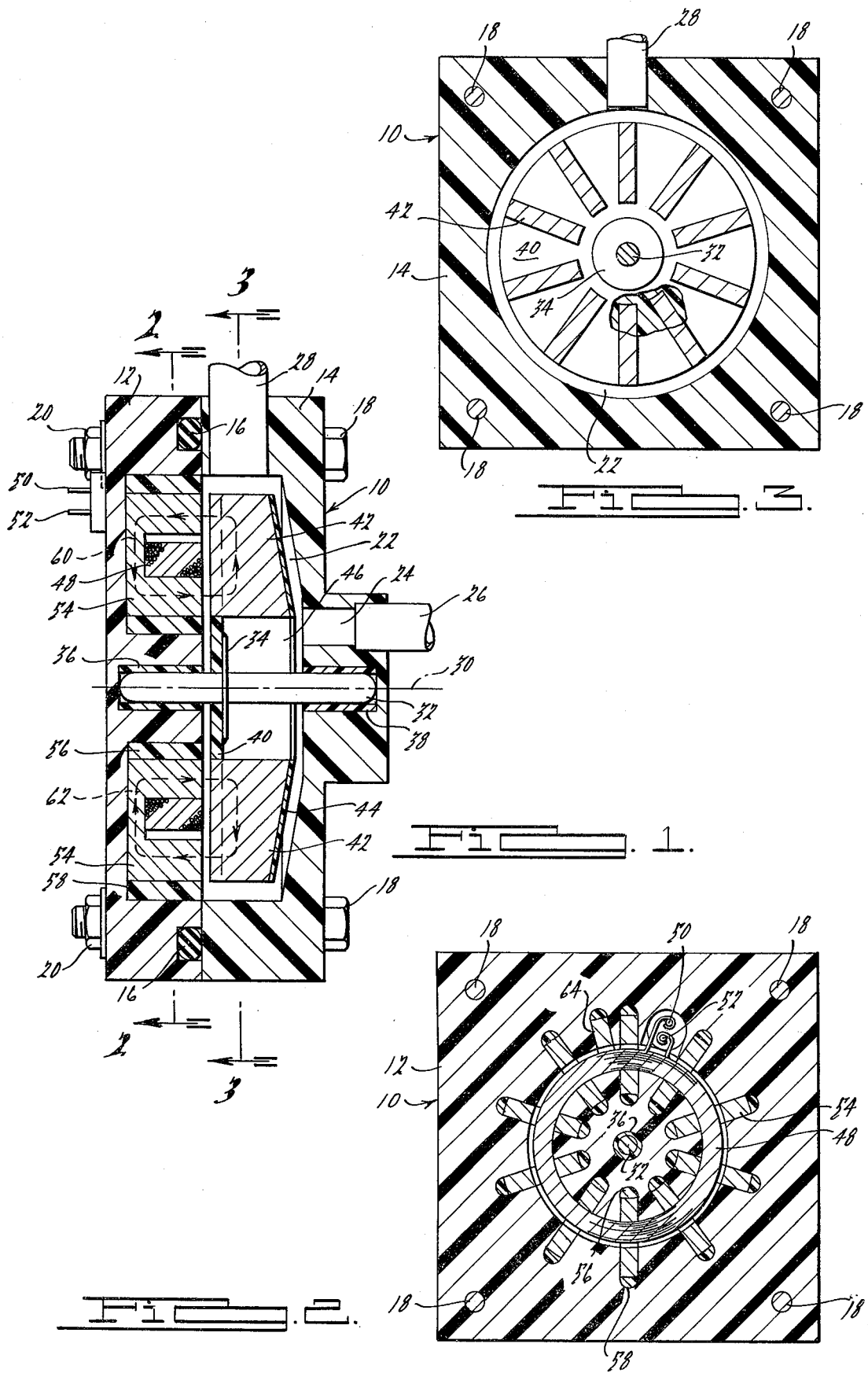

VARIABLE RELUCTANCE MOTOR PUMP

BACKGROUND

This invention relates to a motor pump. More particularly, it relates to a variable reluctance motor which has a rotor assembly that forms the impellor of a centrifugal pump.

Variable reluctance motors are well known in the prior art and various exemplary designs of such motors may be seen in U.S. Pat. No. 3,700,943 to Heintz, 3,700,944 to Heintz et al and 3,714,533 to L. E. Unnewehr, one of the present inventors. These brushless motors employ an exciting winding and a magnetic circuit to produce mechanical torque which is substantially proportional to the square of the winding ampere-turns and to the time rate of change of the magnetic circuit permeance (reciprocal of reluctance), which is a function of the displacement of the rotor in the motor. Typically, these motors employ a stator containing a motor winding and a rotor containing ferromagnetic elements spaced from one another. Displacement of the rotor relative to the stator produces a variation in reluctance, and, hence, permeance of the magnetic circuit of the motor winding. Of course, displacement of the rotor relative to the stator also produces a variation in the self-inductance of the motor winding, this self-inductance being directly related to the permeance of the magnetic circuit.

The torque or force produced by a variable reluctance motor is proportional to the product of the square of the winding ampere-turns and the rate of change of permeance as a function of rotor displacement. From the preceding, it is apparent that motor torque or force that is positive with respect to some arbitrary reference can only be developed when winding ampere-turns are sustained during an interval in which the permeance increases with rotor displacement. Conversely, negative motor torque or force is developed when winding ampere-turns are sustained during an interval in which the permeance decreases with rotor displacement. In order to secure continuous rotation of the variable reluctance motor, it is necessary to apply ampere-turns to the motor winding during intervals of increasing permeance and to decrease or eliminate such ampere-turns during intervals of decreasing permeance.

From the above discussion, it is apparent that the winding of a variable reluctance motor must be excited from a time varying source, although current flow may be unidirectional. Furthermore, the time variations of the source must be synchronized with the mechanical rotation of the machine rotor so that winding current is supplied to the motor during intervals in which the permeance increases with displacement and so that such current is decreased or, preferably, interrupted during the intervals in which the permeance is decreasing with rotor displacement. When a time-invariant source of electrical energy, such as a direct current source, is used, a controller is required to produce synchronized pulsations of control circuits, such as that described in U.S. Pat. No. 3,714,533 mentioned above, also may be used with the motor pump.

SUMMARY OF THE INVENTION

In accordance with the invention, a motor pump is formed from a variable reluctance motor having a rotor which forms the impellor of a centrifugal pump. The motor pump comprises a housing defining an enclosed chamber. The housing has fluid inlet and outlet passages communicating with the chamber and a shaft is journaled in the housing for rotation about its axis. A variable reluctance motor is contained within the housing and comprises a stator and a rotor assembly which is attached to the shaft for rotation therewith. The rotor assembly includes a plurality of ferromagnetic elements equally spaced from one another about the shaft axis. The rotor ferromagnetic elements extend radially from the shaft axis. Fluid flow passages are formed between the ferromagnetic elements. The ferromagnetic elements of the rotor form impellors of a centrifugal pump and permit fluid to be drawn into the inlet passage of the housing. The fluid is forced, through the flow passages in the rotor assembly, to the fluid outlet passage where it is discharged from the motor pump. The ferromagnetic elements of the rotor assembly cooperate with a magnetic circuit portion within the stator to produce rotation of the rotor assembly upon the application of suitable electrical energy to an electrical winding in the stator. Of course, the electrical energy for the variable reluctance motor pump herein described must be supplied in accordance with the requirements for a variable reluctance motor, as indicated in the preceding paragraphs.

The invention may be better understood by reference to the detailed description which follows and to the drawing.

BRIEF DESCRIPTION OF THE DRAWING

FIG. 1 is a sectional elevational view of a motor pump in accordance with the invention;

FIG. 2 is a sectional view of the stator portion and housing of the motor pump of FIG. 1, the section being taken along the line 2—2 of FIG. 1; and FIG. 3 is a sectional view of the rotor portion and housing of the motor pump of FIG. 1, the section being taken along the line 3—3 in FIG. 1.

DETAILED DESCRIPTION

With reference now to the drawings, wherein like numerals refer to like parts in the several views, there is shown a variable reluctance motor pump generally designated by the numeral 10. The motor pump 10 has a housing formed from two parts 12 and 14 made of nonmagnetic material, such as plastic. Pressed aluminum or the like also could be used. An "O"-ring 16 forms a fluid-tight seal between the housing portions 12 and 14 which are secured together by bolts 18 and nuts 20. The stator assembly of the motor pump is located in the housing portion 12 and the rotor assembly is located in the housing portion 14. The housing defines a substantially cylindrically-shaped chamber 22 in which the rotor assembly is located. The housing portion 14 includes a fluid inlet passage 24 that receives an inlet tube 26, which may lead to a fluid reservoir. A fluid outlet passage is formed by a tube 28 positioned in an opening in the housing portion 14.

The fluid outlet tube 28 is located radially outwardly with respect to the central axis 30 of the motor pump. The axis 30 is the axis of a shaft 32 which preferably is made from a nonmagnetic material such as brass or stainless steel. The shaft 32 includes an integral disc-like portion 34 used to secure the rotor assembly of the motor pump to the shaft 32 for rotation therewith. The shaft 32 is journaled for rotation in bushings 36 and 38 located, respectively, in suitably sized openings in the housing portions 12 and 14. The bushings 36 and 38 may be made of polytetrafluoroethylene or other suitable material.

The rotor assembly of the motor pump 10 includes a disc 40 made from a nonmagnetic material, such as fabric-reinforced melamine. The disc 40 is suitable bonded to the disc-like portion 34 of the shaft 32 so that the shaft and disc rotate together about the axis 30. The disc 40 has a plurality of radially extending slots in which a corresponding plurality of ferromagnetic elements 42 are located. The elongated ferromagnetic elements 42, ten in number in the present embodiment, may be made from laminated steel with the length and width dimensions of the laminations extending in the axial and generally radial directions. The ferromagnetic elements 42 are equally spaced from one another about the axis 30. A non-magnetic member 44, having the configuration of a conical washer, is axially spaced from the disc 40 and is bonded to the ends, remote from the disc 40, of the ferromagnetic elements 42. Thus, an open space or flow passage is formed between adjacent ferromagnetic elements 42, the flow passage being defined by the adjacent elements 42, by the disc 40 and by the member 44. When the rotor assembly rotates, fluid is drawn from a reservoir, through the inlet flow passage 24, into the radially inner region 46 of the housing chember 22. The fluid continues to flow, through the flow passages in the rotor assembly defined by the ferromagnetic elements 42 and the disc 40 and the member 44, and is discharged from the motor pump 10 through the outlet flow passage 28. This fluid flow is the result of centrifugal force imparted to the fluid by the rotation of the rotor assembly. The ferromagnetic elements 42 act as impellors which force the fluid toward the discharge flow passage 28 located radially outwardly with respect to the inlet flow passage 24, and the rotor assembly.

The stator of the motor pump 10 is contained within a suitable recess provided therefor in the housing portion 12. The stator includes an electrical coil 48 formed from a number of turns of an electrical conductor. The coil is symmetric about the axis 30, and the ends of the coil conductor are connected to terminals 50 and 52, which extend to the exterior of the housing as shown in FIG. 1, to permit electrical energy to be supplied to the electrical coil 48.

A plurality of U-shaped ferromagnetic elements 54 form a part of the motor pump stator. Preferably, the ferromagnetic elements 54 are formed from U-shaped pieces of steel laminated together. Epoxy resin or the like, may be utilized in the regions 56 and 58 on the radially interior and exterior sides of the stator ferromagnetic elements 54 to maintain these in position and bond them to the housing portion 12. Preferably, the U-shaped stator ferromagnetic elements 54 are equally spaced from one another and correspond in number to the ferromagnetic elements 42 in the rotor assembly. The leg portions of the U-shaped ferromagnetic elements 54 extend toward the rotor assembly and are located so that the ferromagnetic elements 42 of the rotor assembly alternately come into and go out of axial alignment with the U-shaped stator ferromagnetic elements as the rotor assembly rotates with the shaft 32.

When electrical energy is supplied to the electrical coil 48, a magnetic field is produced. The path of the magnetic flux produced by this coil current is indicated by broken lines 60 and 62 in FIG. 1. It may be seen that this flux path is through the stator U-shaped ferromagnetic elements 54 and through the ferromagnetic elements 42 in the rotor assembly. There are two axial air gaps in each flux path, these being located at the ends of the legs of the U-shaped stator ferromagnetic elements 54.

As the rotor assembly rotates, the reluctance of the magnetic circuit varies in a periodic fashion. If electrical current is supplied to the electrical coil 48 during intervals of decreasing magnetic reluctance (increasing magnetic permeance), then motoring torque is produced. This motor operation is well described in the prior art exemplified by the aforementioned U.S. patents. A permanent magnet 64 (FIG. 2) is positioned appropriately in the housing portion 12 to cause the rotor assembly to assume a position aligned therewith so that initial application of electrical energy to the electrical coil 48 causes motoring torque to be produced. This assures starting torque for the motor pump 10 and continued rotation of the rotor assembly results from the supply of electrical energy to the electrical coil 48 during intervals of decreasing magnetic reluctance.

From the preceding description, it is apparent that a motor pump is formed from a variable reluctance motor which has a rotor assembly that produces a fluid pumping action. This rotor assembly has a magnetic circuit in it which cooperates with a magnetic circuit portion in the stator of the motor pump to produce rotation of the rotor assembly when electrical energy is suitably supplied to an electrical coil. The motor pump is very simple in design and has but one moving part. Of course, various modifications may be made in the motor pump described herein without departing from the spirit and scope of the invention.

Based upon the foregoing description, what is claimed is:

1. A motor pump comprising, in combination:

a housing defining a substantially cylindrical enclosed chamber, the axis of said cylindrical chamber being the axis of rotation of said motor pump, said housing having a fluid inlet passage and a fluid outlet passage, said outlet passage being located at or near the radially outer portion of said chamber;

a shaft journalled for rotation in said housing;

a stator for said motor pump, said stator being mounted in said housing and comprising an electrical coil having a plurality of turns, said axis of said chamber also being the axis of said coil, a plurality of U-shaped stator elements made from a ferromagnetic material, said U-shaped elements being equally spaced from one another and each having one of its legs located on the radially inner side of said coil and its other leg located on the radially outer side of said coil, said coil and said U-shaped elements being supported in said housing; and a rotor assembly attached to said shaft for rotation therewith in a position axially adjacent to, and on one side of said stator, said rotor assembly comprising a support structure made from a nonmagnetic material and a plurality of rotor ferromagnetic elements, said support structure including a disc and a washer-shaped member spaced from one another along the axis of said shaft, said disc being secured to said shaft and said rotor ferromagnetic element being located between said disc and said member, said rotor ferromagnetic elements being positioned in equally-spaced locations in said support structure to permit them alternately to come into and go out of axial alignment with said U-shaped stator ferromagnetic elements when said shaft and rotor assembly are rotated, said rotor assembly having radially extending passages between said rotor ferromagnetic elements, each of said radially extending passages being bounded by said disc, by said member and by two of said rotor ferrromagnetic elements, said passages permitting fluid flow therethrough from said housing inlet passage to said housing outlet passage upon the application of suitable electrical current to said electrical coil.

* * * * *